April 7, 1970
F. HALOSKI
3,504,822
CONTAINER AND VENTING DEVICE
Filed May 28, 1968
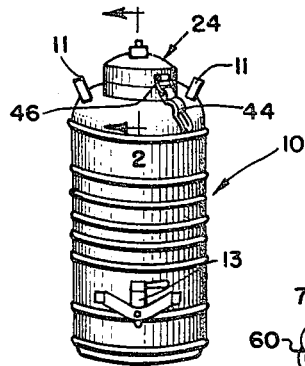
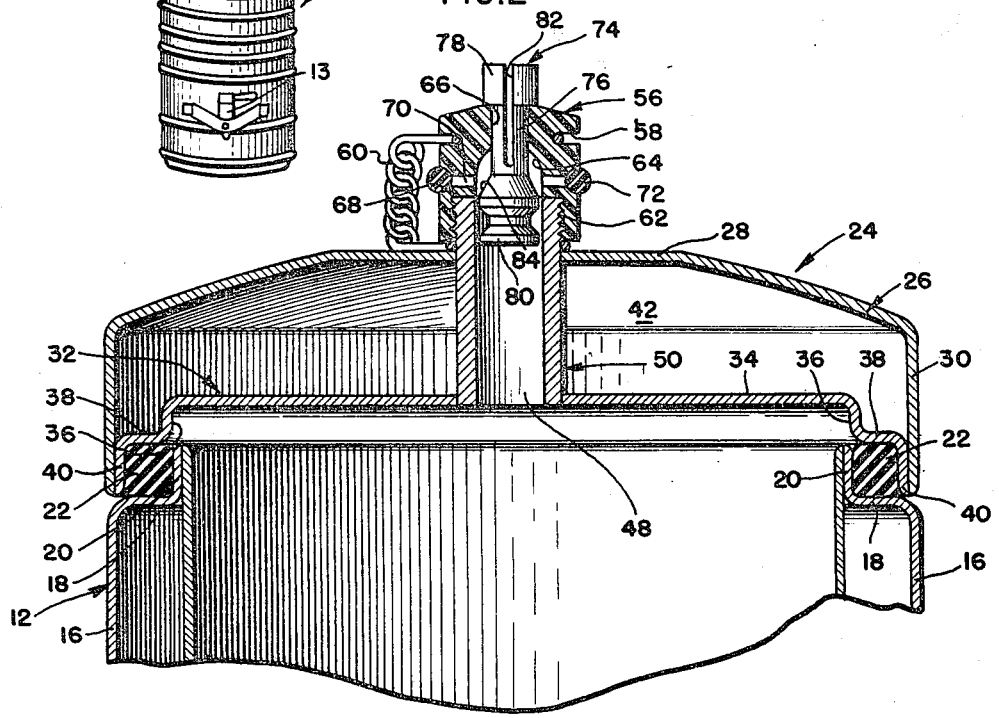
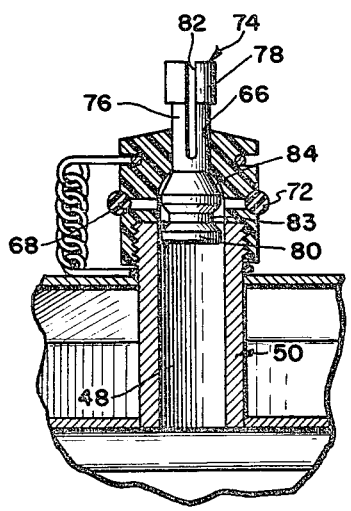
INVENTOR
FRANK HALOSKI
*Anderson, Luedeka, Fitch, Even & Tabin*
ATTYS.

United States Patent Office 3,504,822
Patented Apr. 7, 1970

3,504,822
CONTAINER AND VENTING DEVICE
Frank Haloski, Downers Grove, Ill., assignor to Vacuum
Can Company, Chicago, Ill., a corporation of Illinois
Filed May 28, 1968, Ser. No. 732,754
Int. Cl. B65d 51/16
U.S. Cl. 220—44                        6 Claims

ABSTRACT OF THE DISCLOSURE

A venting device is provided for use with a container for storing and dispensing liquids. The device permits venting of vapor from withtin the container when a maximum predetermined pressure is reached, prevents liquid from leaving the container through the vent opening, and permits air to enter the container to prevent the formation of a vacuum as liquid is removed from the closed container through a dispensing opening.

---

The present invention relates to containers for storing and dispensing liquids such as, for example, hot coffee. The invention is particularly directed to venting devices for use on such containers.

In many industries and businesses, it is not unusual to provide hot foods, soups, and beverages for the enjoyment and convenience of employees and customers. Frequently, these foods are prepared at a location remote from the location at which they are served. For example, in a large facility such as a plant or office building, the foods may be prepared in a central kitchen and transported to various locations where they are easily accessible to a relatively large group of people. In smaller offices and businesses, the foods may be prepared by caterers at a central facility and delivered to customers on a prearranged basis.

It is customary to transport hot liquids such as coffee, hot chocolate, tea and soup in large stainless steel vacuum insulated containers provided with a dispensing faucet or tap. The liquid is placed in this container when very hot, a lid is placed on the container, and the container is transported to the site of use for dispensing into individual cups or similar receptacles.

There are certain problems associated with the use of such containers. In the first place, a hot liquid poured into a container vaporizes within the container and, when the lid is secured in place during such vaporization, a pressure is created in the head space between the upper surface of the liquid and the lower surface of the lid. This pressure can be as high as 20 p.s.i.g. in a ten-gallon container. The container lids are normally provided with a soft rubber composition gasket intermediate the lid and container bottom to retain the liquid in the container, and these gaskets tend also to prevent the leakage of vapor up to a head pressure of between ten and twelve p.s.i.g. At a higher pressure, however, the vapor tends to deform the gasket and/or lid sufficiently to permit the vapor to vent past the gasket.

Generally, a worker will lift a container containing hot liquid by grasping handles located on opposite sides of the container while resting the upper portion of the container against the forward part of his body. This places stress on the outer surface of the lid which, in combination with the internal pressure within the container, is frequently sufficient to effect the additional deformation of the lid which permits a rapid release of the heated vapor from within the container. Unfortunately, this vapor all too often is vented onto the clothes and skin of the worker, causing painful burns.

If the vapor is not vented during transit, and the pressure head is not relieved, a considerable pressure will exist within the container when the faucet is initially opened to dispense the liquid, causing the liquid to spurt out at high velocity, splashing and burning an unsuspecting user and occasionally knocking the cup from his hand. However, after the pressure has been reduced to atmospheric by the removal of a portion of the liquid, the removal of an additional amount of liquid creates a partial vacuum within the head space, causing the lifuid to flow from the container very slowly and, eventually, not at all.

Although these problems could theoretically be rectified by the provision of small vent holes in the lid, this is not practical. During transit, the containers are frequently jostled considerably and the sloshing of the liquid would be certain to cause at least a portion of it to pass through the openings and out of the container. Moreover, the containers are sometimes tipped or inverted during transit (such as when they are carried by only one of a pair of opposed handles) and, under such circumstances, a considerable amount of liquid would be lost through an unplugged opening in the lid.

A current attempt to solve this problem involves the use of a vent cap which defines passageways providing communication between the atmosphere and the pressure head above the liquid. These passageways are open when the cap is in one rotative position relative to the lid but are closed when the cap is in another rotative position. In use, the cap is oriented so that the passageways are closed during transit to prevent loss of liquid as a result of a sloshing of the liquid or a tipping of the container. The cap is rotated to open the passageways when the container arrives at the dispensing site so as to relieve the pressure in the container and so as to prevent the creation of a vacuum within the container as the liquid is dispensed. The use of such a cap prevents the surge of liquid upon initial dispensing and prevents the creation of a vacuum upon further dispensing, but does not prevent the build-up of a dangerous pressure head before and during transit. Accordingly, this cap does not protect workers who handle containers filled with hot liquid. Also, a user who is not familiar with the cap construction may not realize that the cap must be rotated before dispensing and may thus be burned by an initial surge of liquid through the faucet.

It is an object of the present invention to provide an improved container for transporting and dispensing liquids. It is a further object of the invention to provide an improved venting device for containers for transporting and dispensing liquids.

Other objects and advantages of the invention will become apparent with reference to the following description and the accompanying drawing.

In the drawing:

FIGURE 1 is a perspective view of a container showing various of the features of the invention;

FIGURE 2 is an enlarged fragmentary sectional elevational view taken along line 2—2 of FIGURE 1; and FIGURE 3 is a view of a portion of the container as shown in FIGURE 2, but showing one of the elements in a different operative position.

The present invention will hereinafter be described with reference to a container 10 shown most completely in FIGURE 1. To facilitate a clear understanding of the invention, and by way of example, it will be assumed that the container is capable of containing hot liquids such as coffee, tea, soup, etc., for storage and during the transporting of the liquid from one locatiton to another. It is also assumed that the container is adapted to dispense the liquid when it arrives at its destination. For purposes of discussion, this container may be considered similar to that shown in FIGURE 1 of U.S. Patent No. 2,620,-945.

Very generally, the container 10 is preferably of stainless steel construction and includes a generally cylindrical body which narrows rapidly near its upper end to provide a neck 12. In a preferred construction, the container is vacuum insulated, i.e., it includes an outer shell which is seen in FIGURE 1 herein, but it also includes an inner vessel not shown in its entirety in the drawing but clearly seen in the drawings of the aforementioned Patent No. 2,620,945. The walls of the outer shell and inner vessel are spaced from each other and this space is evacuated to provide the desired insulation. Handles 11 are mounted on the top wall of the container adjacent the neck 12, and a dispensing faucet 13 is affixed to the container near the base thereof in communication with the lower containing surface of the interior of the vessel.

The neck 12 is preferably defined by a first or lower portion 16 which is adjacent and extends upwardly from the top wall of the container, a generally horizontal ledge 18, and an upstanding rim 20. The ledge and rim cooperate to define an annular notch which is occupied by a gasket 22. In a preferred embodiment, this gasket is formed of a soft composition rubber and is of such a size as to normally extend slightly above the rim 20 so that it will be compressed slightly and expand laterally by engagement with a lid 24 when the lid is clamped in place.

The lid 24 is also of stainless steel construction and includes an outer shell 26 which, in the position in which it is illustrated, is formed to define a slightly domed top wall 28 having a depending annular peripheral skirt 30. Secured within the lid is a lower wall 32 which includes a generally flat circular central portion 34 offset adjacent its periphery to form an inner depending flange 36, a generally horizontal shoulder 38 extending outwardly from the lower edge of the flange 36, and an outer flange 40 which depends from the outer periphery of the shoulder 38. The lower edge of the flange 40 is secured to the lower edge of the skirt 30 with the central portion of the lower wall 32 spaced from the domed top wall 28 to define the chamber 42 which is evacuated to provide a vacuum insulation.

The lid is placed on the container with the generally horizontal shoulder 38 of the lid in contact with the upper surface of the gasket. The lid is then clamped in place so as to compress the gasket by the interengagement of clamping straps 44 pivotally attached to the lid 24 and lugs 46 secured to the container adjacent the neck 12. A clamping arrangement which may be used is disclosed in U.S. Patent No. 2,960,250.

When the lid is clamped in place, the gasket prevents liquid from escaping from the container as the liquid is sloshed about during transit and if the container is tipped or inverted while being handled. The gasket also prevents the escape of vapor from the container up to a certain maximum head pressure within the container, e.g., 10 to 12 p.s.i.g. Prior to the present invention, when the head pressure exceeded this maximum, it deformed the gasket and the lid (as by spreading the skirt 30), allowing the vapor to escape between the gasket and the skirt. As previously pointed out, this deformation of the lid and gasket was frequently aided inadvertently by a worker who, when he lifted the container by the handles 11, pulled the lid into contact with his body, thus applying a further deforming force to the lid.

The lid 24 is provided with a vertical passageway 48 to permit hot vapor to leave the container and to permit air to enter the container as the liquid is being dispensed. In the illustrated embodiment, this passageway 48 is defined by a tube 50 which extends upwardly through an opening in the center of the lower wall 32. The tube 50 is suitably secured to each the top wall and the lower wall to provide an air-tight connection which will insure the maintenance of a vacuum in the lid chamber 42. The upper end of the tube 50 which projects above the top wall 28 is threaded to receive a vent cap 56, hereinafter described, which controls the passage of fluid through the passageway 48.

The vent cap 56 controls the passage of vapor upwardly through the passageway 48 when the vapor above the liquid is vented, and also controls the passage of air downwardly through the passageway to prevent the creation of a vacuum within the container as liquid is dispensed. As seen best in FIGURE 2, the cap includes a body which is preferably formed of a polyfluorinated hydrocarbon such as that sold under the trademark Nylon and is hexagonal in transverse cross section. A small groove 58 is provided near its upper end to receive the clasp of a retaining chain 60, the opposite end of the chain being secured to the upper end of the tube 50 beneath the threads thereof.

The cap 56 is provided with an internal cavity which is open at its upper and lower ends and in communication with the passageway 48 of the tube, thereby providing in effect an extension of the passageway 48. The cavity of the cap is formed to define a generally cylindrical lower portion 62 and a generally convex central portion 64 which terminates in a cylindrical channel 66 extending to the upper surface of the cap body. The generally cylindrical lower portion 62 of the cavity is provided with internal threads which mate with the external threads of the vent cap to the lid; the channel 66 is of a significantly lesser diameter than the lower portion 62 of the cavity.

As will be noted in the drawing, the outer surface of the body of the vent cap is provided with an annular groove 68 located about midway of the height of the cap. An orifice 70 extends inwardly from the side wall of the groove into communication with the convex central portion 64 of the cavity from each of diametrically opposed sides of the vent cap to provide communication between the cap cavity and the atmosphere. An O-ring 72 formed of natural or synthetic rubber occupies the groove 68 and is of sufficient size and elasticity to seal the outer ends of the orifices 70. However, the tension of the O-ring is such that it will be expanded in response to a predetermined maximum vapor pressure within the cavity to unblock the orifices and permit vapor within the container to be vented.

Thus, by virtue of the presence of the O-ring and orifice of the vent cap, a pressure build-up within the container is relieved above a predetermined amount. That is, the pressure within the container will not exceed a predetermined value determined by the tensile strength of the O-ring. It is believed preferable to select an O-ring which will not unblock the orifices until the internal pressure within the container reaches about 5 p.s.i.g. so that the orifices will not be opened by the pressure of liquid against the O-ring if the container is tipped or overturned. The amount of venting is thus less than it would be if the interior of the container were continuously open to the atmosphere, so that the amount of heat lost through venting is also less. Of course, the O-ring is selected so that it will open the orifices before a dangerous situation is created. It is believed preferable to select an O-ring which allows vapor to be vented at between 5 and 8 p.s.i.g. head pressure.

Carried by the cap 56 is a vent rod 74 which is preferably formed of a polyfluorinated hydrocarbon and includes a stem 76 adapted to be disposed within the channel 66, a head or stop 78 in the form of a knob adapted to normally be positioned above the upper surface of the cap, and a plug 80 at its opposite end. The stem 76 is of a diameter somewhat less than the diameter of the channel 66 so that it will slide freely up and down therein. The stem is also of somewhat greater length than the channel 66 and projects outwardly beyond each end of the channel.

The head or stop 78 and plug 80 are each of larger diameter than the passageway 66; however, a longitudinally disposed slot 82 is provided in the rod which extends downwardly through the head 78 and terminates adjacent the plug 80 so as to permit the upper portion of the rod to be squeezed or collapsed for insertion into and removal from the channel 66, and in this regard, the plug is provided with an annular groove 83 to facilitate the extraction of the rod from within the cap body. The natural resilience of the material of which the rod is formed enables it to return to its normal size after being collapsed so that it will normally be larger at each end than the passageway and will thus remain in place with the stem disposed within the passageway. The head or stop 78 is of such a configuration that when it rests upon that portion of the top wall of the cap defining the upper end or mouth of the channel 66, it does not completely close the channel, thus permitting air to by-pass the head and enter the container. In the illustrated embodiment, the slot 82 extends a sufficient distance into the stem to provide communication between the interior of the cap and the atmosphere when the rod is in the position shown in FIGURE 2. However, the head 78 could also be made in various shapes which would permit it to be by-passed, and the stem 76 could be made of somewhat lesser diameter or of a different configuration than the channel 66.

The plug 80 includes an upper sealing surface 84 which, when the rod is raised so as to urge the surface 84 into engagement with the lower end of the channel 66, provides a seal which prevents the escape of vapor from the container through the channel. The raised position of the rod is shown in FIGURE 3.

When there is little or no pressure within the container, the rod 74 assumes the full line position of FIGURE 2 in which the lower surface of the head 78 rests on that portion of the cap which defines the periphery of the upper edge of the channel 66. In such a position, vapor within the container can easily pass around the plug 80 and outwardly through the slot 82 to the atmosphere. Thus, when the container is initially filled, a very small amount of vapor can be vented through the channel 66. However, the rod 74, as contemplated, is very light in weight, i.e., less than one-tenth of an ounce, and will thus be forced upwardly as soon as the pressure within the container exceeds a certain minimum value of, for example, one p.s.i.g. This brings the upper surface 84 of the plug 80 into engagement with the portion of the cap defining the lower end of the channel 66 and closes the channel, thereby preventing further escape of vapor until the O-ring 72 is extended to allow venting through the orifices 70. The rod is also forced outwardly to seal the channel 66 by an outward surge of liquid, as by a sloshing of the liquid or a tipping of the container.

On the other hand, when the rod is in its lowermost position, air can easily by-pass it and enter the container through the slot 82 and channel 66. Thus, when the liquid is being dispensed from the container and the pressure within the container is released, the rod will drop to its lowermost position and prevent a vacuum from being created above the surface of the liquid.

The cap thus performs several functions. When the container is initially filled and the lid is fixed in place, the liquid continues to vaporize within the container and creates a pressure head above the surface of the liquid. For a very short time, this pressure head will be released through the channel 66 but, almost immediately, the pressure will be sufficient to elevate the rod 74 so as to bring the sealing surface 84 of the plug 80 into sealing engagement with the lower end of the passageway and prevent further venting. With no other venting possible, the pressure within the the container will rise until it equals that predetermined pressure at which the O-ring 72 will expand sufficiently to open or unblock the orifices 70. The pressure within the container will therefore not exceed this predetermined value. However, during the transport and storage of the container, there is a minimum of venting consistent with this maximum permissible pressure and, thus, a minimum of heat loss through venting of the hot vapor.

The container is then transported to a location where the liquid is to be dispensed. During transport, if the container is inadvertently or unavoidably jostled, tipped or inverted, the liquid will not escape since the rod is in its outwardly extending sealing position and the orifices are closed by the O-ring 72.

When the container is delivered to the location at which the dispensing will take place, the initial quantity of liquid removed through the faucet 13 may be under somewhat greater pressure than would normally be expected solely from gravity flow because of the existence of the pressure head of from 5 to 8 p.s.i.g. within the container. However, this pressure head will not normally be sufficient to cause the liquid to exit from the container with sufficient force to inflict injury on those withdrawing the liquid. As soon as the pressure head within the container drops below approximately one p.s.i.g., the vent rod 74 drops to its lowermost position and air is allowed to enter the container so that the formation of a vacuum is prevented.

It is important to note that during the entire period in which the container is being carried and transported, the pressure head within the container never reaches a value high enough to cause the vapor to by-pass the gasket 22. Thus, there is no possibility of serious burns occurring to personnel handling the container as a result of the escape of such vapor. The cap automatically prepares itself for each condition under which the container is being used. It prevents a dangerous pressure head from being created within the container when the liquid is merely being stored or transported, but automatically permits air to enter the container when liquid is being dispensed. It is thus not necessary that personnel handling the container be instructed to periodically vent the container, and it is not necessary that they be cautioned in the normal handling of the container.

While the invention has been shown and described with respect to one specific embodiment thereof, it should be apparent that various modifications may be made therein without departing from the scope of the invention. For example, although the vent cap 56 was shown as an item which is adapted to be detachably secured to the lid, the invention might also be incorporated in the lid as an integral part thereof. Thus, the tube 50 might well be fabricated at its upper end with an annular groove such as the groove 68 capable of accommodating the O-ring, and with a central pasageway such as the passageway 66 capable, at its upper end, of accommodating a vent rod. Also, while various materials of construction have been suggested throughout the application, it should be clear that substitutions consistent with the intended use of the invention could also be made.

Various of the features of the invention are set forth in the following claims.

What is claimed is:

1. For use with a container for storing and dispensing liquids, said container including means defining a vent passageway in the upper part of said container, an outlet opening in the lower part of said container, and a valve in said outlet opening for selectively withdrawing liquid from within the container: the improvement which comprises a valve asociated with said vent passageway for controlling the passage of fluid therethrough, said valve including a valve body defining a channel in communication with said passageway, said channel having a mouth at its outer end, an elongated vent rod having a stem slidably disposed within said channel for longitudinal movement therein and having a length somewhat greater than the length of said channel, said vent rod also including a stop on the outer end of said stem above the mouth of said channel and a plug on the lower end of said stem beneath the lower end of said channel, said stop being dimensioned so as to span the mouth of said channel and thereby preclude the passage of said stop downwardly through said channel under normal use of the container, said vent rod having an opening therein extending downwardly from said stop into communication with the interior of said container, the configuration of said vent rod and stop being such as to preclude a fluid tight seal at the mouth of said channel and the creation of a subatmospheric pressure above the liquid in the container as portions of the liquid are withdrawn through said outlet valve, said plug being dimensioned so as to seal said channel and preclude the passage of fluid outwardly of the container when said plug is positioned in engagement with the walls defining the lower end of said channel.

2. A container vent vale in accordance with claim 1, wherein said opening extends through a portion of each said stop and said stem to provide communication between the atmosphere surrounding said stop and the interior of said channel when said stop is in engagement with the walls defining the mouth of said channel.

3. A container vent valve in accordance with claim 1, wherein said vent rod is formed of a single unitary piece of flexible resilient material, wherein said stop is in the form of a knob of a greater diameter than the diameter of the mouth of said channel, and wherein said opening is in the form of a slot extending from the upper end of said stop sufficiently into said stem so as to permit said stop to be collapsed sufficiently to permit it to pass through said channel for assembly and disassembly.

4. A container vent valve in accordance with claim 1, wherein at least one orifice in said valve body provides communication between said passageway and the atmosphere, and wherein means are provided to preclude any vapor under a pressure less than a predetermnied minimum value from passing outwardly of the passageway through said orifice.

5. A container vent valve in accordance with claim 4, wherein said means precluding vapor under a pressure less than a predetermined minimum value from passing outwardly of the passageway through said orifice comprises an elastic stretchable O-ring surrounding a portion of the valve which includes said orifice, said O-ring being positioned so as to obstruct the outer end of said orifice when properly positioned but being stretchable so as to be moved out of an obstructing position by vapor in said passageway under a pressure exceeding the predetermined minimum.

6. A container vent valve in accordance with claim 1, wherein said stop is movable between a first position in which surfaces thereof engage surfaces of said valve body adjacent said channel mouth to preclude the passage of said stop downwardly through said channel, and a second position in which said stop can be passed through said channel wtihout being detached from said vent rod.

References Cited

UNITED STATES PATENTS

| 2,620,945 | 12/1952 | Becker | 222—131 |
| 2,787,400 | 4/1957 | Fritsch | 137—512.3 XR |

GEORGE T. HALL, Primary Examiner

U.S. Cl. X.R.

137—525; 222—188, 397